United States Patent
Yau

(10) Patent No.: US 10,004,093 B2
(45) Date of Patent: *Jun. 19, 2018

(54) PTP INTERACTION ASSOCIATION SYSTEM SUPPORTING CONNECTION BETWEEN AUDIO ELECTRONIC PRODUCT AND INTERNET

(71) Applicant: Yimwai Yau, Hong Kong (CN)

(72) Inventor: Yimwai Yau, Hong Kong (CN)

(73) Assignee: Timwai Yau (CN)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/309,178

(22) PCT Filed: May 4, 2015

(86) PCT No.: PCT/CN2015/078207
§ 371 (c)(1),
(2) Date: Feb. 10, 2017

(87) PCT Pub. No.: WO2015/169194
PCT Pub. Date: Nov. 12, 2015

(65) Prior Publication Data
US 2017/0215217 A1    Jul. 27, 2017

(30) Foreign Application Priority Data

May 4, 2014   (CN) .................... 2014 2 0234008 U
May 5, 2014   (CN) .................... 2014 2 0237384 U
(Continued)

(51) Int. Cl.
H04W 76/02      (2009.01)
H04W 4/00       (2018.01)
(Continued)

(52) U.S. Cl.
CPC ....... *H04W 76/023* (2013.01); *H04L 61/1582* (2013.01); *H04W 4/005* (2013.01); *H04W 4/008* (2013.01); *H04W 84/12* (2013.01)

(58) Field of Classification Search
CPC .................... H04W 4/008; G06F 17/30887
See application file for complete search history.

(56) References Cited

U.S. PATENT DOCUMENTS 6,335,927 B1 *  1/2002  Elliott ..................... H04L 12/14
                                                           370/352
7,441,710 B2 * 10/2008  Perkowski ........ G06F 17/30876
                                                        235/462.01

* cited by examiner

*Primary Examiner* — Tuan H Nguyen
(74) *Attorney, Agent, or Firm* — PROI Intellectual Property US

(57) ABSTRACT

The present invention relates to a kind of Internet of Things technology, and in particular to a PTP interactive interconnected system supporting a connection of an electronic audio product with the Internet. The system comprises a communication terminal product supporting the PTP interactive interconnected system, a URL electronic data device, an electronic audio product and a numeric mark, wherein the electronic audio product supports sound playing; the communication terminal product supports the input of the numeric mark corresponding to the sound playing; and an operating system of the communication terminal product receives an instruction from the numeric mark, calls out paired URL electronic data stored in the URL electronic data device, and sends a relevant request to a back-end server after processing the paired URL electronic data, and the back-end server returns an electronic file associated with the URL electronic data according to the relevant request.

11 Claims, 5 Drawing Sheets

(30) Foreign Application Priority Data

May 5, 2014 (CN) .................... 2014 2 0237440 U
Sep. 4, 2014 (CN) .................... 2014 2 0519388 U

(51) Int. Cl.
*H04L 29/12* (2006.01)
*H04W 84/12* (2009.01)

PTP INTERACTION ASSOCIATION SYSTEM SUPPORTING CONNECTION BETWEEN AUDIO ELECTRONIC PRODUCT AND INTERNET

CROSS REFERENCE TO RELATED APPLICATIONS

The present application is the US national stage of International Patent Application PCT/CN2015/078207 filed on May 4, 2015, which, in turn, claims priority to Chinese Patent Applications CN 201420234008.X filed on May 4, 2014, CN 201420237440.4 filed on May 5, 2014, CN 201420237384.4 filed on May 5, 2014, and CN 201420519388.1 filed on Sep. 4, 2014.

BACKGROUND OF THE INVENTION

1. Technical Field

The present invention relates to a kind of Internet of Things technology, and in particular to a PTP interactive interconnected system supporting a connection of an electronic audio product with the Internet to provide technical support enabling achieved Internet Plus for a traditional industry.

2. Description of Related Art

An advertising product based on traditional media is significantly behind that of electronic media in transmission capability, nevertheless, it is absolutely not the fact that "an ultimate form of mass media may replace any one of media such as traditional print media, traditional broadcasting, traditional television and traditional Internet", as promoted by some people.

Information accessibility includes two major categories: one is network accessibility, and the construction of website accessibility falls under the category of network accessibility issues; and the other is electronics and information technology accessibility, which is to address seamless cross-media interconnection.

The Internet Society of China provides a definition as follows: information accessibility refers to any person (including the healthy, the disabled, the young and the old) under any circumstances being able to get access to and make use of information equally and conveniently without barriers.

If a smart phone is used to log on to the Internet for the information related to a print media product and get access to richer relevant data through extension, an association technology is a necessary condition that cannot be crossed out.

At present, it is a mainstream concept to enable offline and online connection for a plane media product with the solution of two-dimensional barcode/quick response code patterns in the market. Even though a mature product and industry chain has formed regarding the two-dimensional barcode/quick response code patterns, there are many restrictions on the technical use conditions in actual operation, and this refer to the following restrictions:

1. a smart phone can scan a two-dimensional barcode/quick response code pattern only after downloading an appropriate application;
2. the clarity of the two-dimensional barcode/quick response code pattern;
3. the light for scanning the two-dimensional barcode/quick response code pattern;
4. the distance for scanning the two-dimensional barcode/quick response code pattern;
5. the two-dimensional barcode/quick response code pattern is not uniform in size and its attachment may affect the aesthetic appearance of an advertising board;
6. with each two-dimensional barcode/quick response code pattern corresponding to one URL (short for "Uniform Resource Locator") electronic data, there are numerous two-dimensional barcode/quick response code patterns present so as to meet the market demand, which can be expected to lead to chaos; and
7. the two-dimensional barcode/quick response code pattern is embedded into a screen picture of a video product or a webpage;
  (1) during actual operation, the time for an electronic screen to display the two-dimensional barcode/quick response code pattern is very short, and it is difficult for a user to conduct the operation;
  (2) in case of a non-high definition video image, the two-dimensional barcode/quick response code pattern is caused to distort and thus becomes unreadable; and
  (3) in case of wobbling public transportation, the two-dimensional barcode/quick response code pattern is very difficult to read.

It is particularly emphasized that the solution of two-dimensional barcode/quick response code patterns is less competent to address the connection involving an audio/video product (an audio information technology).

Today, science and technology have entered into the era of human-computer interaction. In the public places of major cities, with the convergence between mobile networks and fixed networks, information accessibility is a technical barrier that cannot be crossed out for accessing the Internet anytime anywhere through a smart phone and achieving the development goal of smart cities.

As an important part of the new generation of information technology, the Internet of Things has been widely applied to network convergence, and thus is also known as the third wave following computer and Internet, in the development of the information industry around the world.

First, the Internet of Things still takes Internet as its core and foundation, and it is a network extending and expanding based on the Internet; and second, the clients of the Internet of Things have extended and expanded among any items for information exchange and communication, that is, things are closely linked.

As the Internet of Things technology develops continuously, there is an inevitable development trend of deep convergence between traditional industries and Internet technologies.

Therefore, there is an urgent expectation from the market to meet the requirements anytime anywhere at will with an easier, faster and more efficient Internet of Things technology.

BRIEF SUMMARY OF THE INVENTION

To achieve the object above, the present invention provides a PTP interactive interconnected system supporting a connection of an electronic audio product with the Internet, comprising a communication terminal product supporting the PTP interactive interconnected system, a URL electronic data device, an electronic audio product and a numeric mark, wherein the communication terminal product supports a remote communication function; the communication terminal product supports a short distance communication function; and the URL electronic data device consists of a built-in URL electronic data device and a trigger URL electronic data device; the URL electronic data device stores a URL electronic data combination; the electronic audio product supports sound playing; the communication terminal product supports the input of a numeric mark corresponding to the sound playing; and an operating system of the communication terminal product receives an instruction from the numeric mark, calls out paired URL electronic data stored in the URL electronic data device, and sends a relevant request to a back-end server after processing the paired URL electronic data, and the back-end server returns an electronic file associated with the URL electronic data according to the relevant request.

The communication terminal product supports the remote communication function, and requests a relevant telecommunication network to return an electronic file associated with the URL electronic data.

The communication terminal product supports WIFI (Wireless Fidelity) technology, and requests a connected WIFI device to return an electronic file associated with the URL electronic data.

The short distance communication function of the communication terminal product supports Bluetooth technology.

The URL electronic data device sends the URL electronic data containing an identification code of the PTP interactive interconnected system by means of Bluetooth technology.

The URL electronic data device consists of a built-in URL electronic data device and an automatic trigger URL electronic data device.

The built-in URL electronic data device is equipped in the communication terminal product, and the built-in URL electronic data device stores a raw URL electronic data combination.

The automatic trigger electronic data device is equipped in the electronic audio product, and sends the URL electronic data based on a time condition set by the electronic audio product to activate the raw URL electronic data combination stored in the built-in URL electronic data device of the communication terminal product and transforms the raw URL electronic data combination into another new set of URL electronic data combination.

The automatic trigger URL electronic data device continuously sends single URL electronic data in a set time.

The numeric mark corresponding to the sound playing is correspondingly paired with the URL electronic data combination stored in the URL electronic data device (90).

The electronic audio product is provided with a light source function system, and the URL electronic data sent by the automatic trigger URL electronic data device (94) is matched with a change in a light source function.

The technology of the present invention is a URL electronic data transmission device supporting a PTP (Point to Page of Internet) interactive interconnected system, and provides technical support enabling the deep convergence between traditional industries and Internet technologies, achieved Internet Plus.

1. The technology of the present invention employs the URL electronic data of the international standard technology as a media technology for the interactive interconnected system, and the communication terminal product supports the input of the corresponding numeric character according to the numeric mark, truly enabling barrier-free connection.

2. With the simplest point to point connection technology, a new technical direction of solution is provided regarding the big data congestion problem confronted by the development of the Internet.

3. The URL electronic data stored in the URL electronic data device designed by the present invention is an raw URL electronic data combination, which may change as required through the functional support of the URL electronic data device, either meeting numerous user requirements in the market or preventing the chaos caused by the overlapping of numeric marks.

The present invention is obviously superior to the solution of two-dimensional barcode/quick response code patterns in the market and the relevant solutions of connection technologies in terms of both operation and effect, thereby meeting the vision of obtaining information anytime anywhere at will in the era of mobile information.

DETAILED DESCRIPTION OF THE INVENTION

Figure 1A:
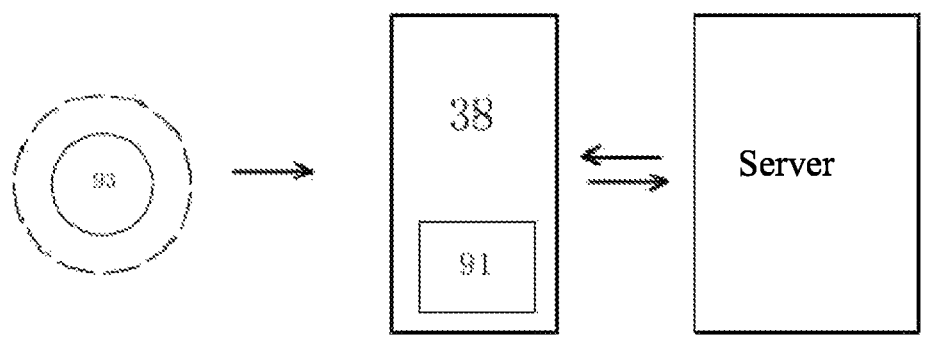
FIG. 1A is a schematic diagram of a structure of a technology of the present invention.

The following embodiments are intended to further explain and illustrate the present invention, instead of setting any limit to the present invention.

The present invention provides a PTP interactive interconnected system supporting a connection of an electronic audio product with the Internet, comprising a communication terminal product (38) supporting the PTP interactive interconnected system, a URL electronic data device 90, an electronic audio product 51 and a numeric mark, wherein the communication terminal product supports a remote communication function; the communication terminal product supports a short distance communication function; and the URL electronic data device 90 consists of a built-in URL electronic data device 91 and a trigger URL electronic data device 93; the URL electronic data device 90 stores an URL electronic data combination; the electronic audio product 51 supports sound playing; the communication terminal product supports the input of a numeric mark corresponding to the sound playing; and an operating system of the communication terminal product receives an instruction from the numeric mark, calls out paired URL electronic data stored in the URL electronic data device 90, and sends a relevant request to a back-end server after processing the paired URL electronic data, and the back-end server returns an electronic file associated with the URL electronic data according to the relevant request.

The communication terminal product supports the remote communication function, and requests a relevant telecommunication network to return an electronic file associated with the URL electronic data.

The communication terminal product supports WIFI (Wireless Fidelity) technology, and requests a connected WIFI device to return an electronic file associated with the URL electronic data.

The short distance communication function of the communication terminal product supports Bluetooth technology, and obtains the URL electronic data from a relevant external product.

The URL electronic data device sends the URL electronic data containing an identification code of the PTP interactive interconnected system by means of Bluetooth technology.

When the communication terminal product is within a sending range of the URL electronic data, the communication terminal product supporting the PTP interactive interconnected system can display a PTP information sensing symbol.

The specific operation of the technology of the present invention is divided into two types of methods as follows.

The first method: a user presses a PTP functional key to immediately receive the electronic file linked to the URL electronic data sent by the URL electronic data device.

As shown in FIG. 1A, the returned electronic file is browsed through a display screen of the communication terminal product.

The second method: a user presses a PTP functional key so that a PTP operation interface appears on the display screen of the communication terminal product, and then selects a different numeric character as required to conduct an operation.

Figure 1B:
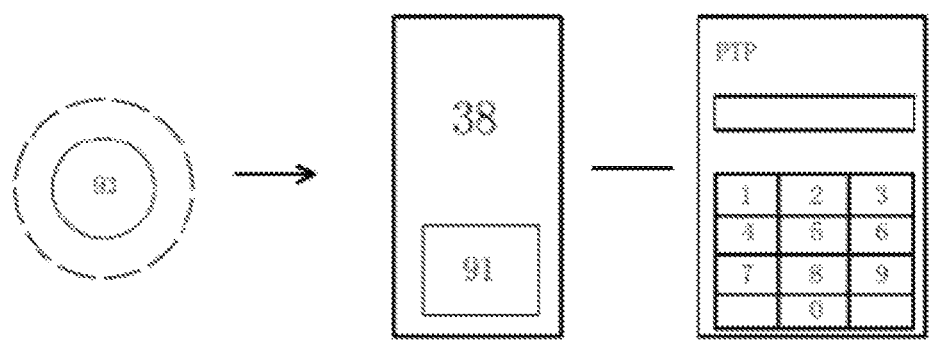
FIG. 1B is a schematic diagram of a structure used by the technology of the present invention.

As shown in FIG. 1B, the URL electronic data device 90 consists of a built-in URL electronic data device 91 and an automatic trigger URL electronic data device 94.

As shown in FIG. 2, the automatic trigger URL electronic data device 94 is equipped in the electronic audio product 51. The automatic trigger URL electronic data device sends the URL electronic data based on a time condition set by the electronic audio product to activate the raw URL electronic data combination stored in the built-in URL electronic data device 91 of the communication terminal product and transforms the raw URL electronic data combination into another new set of URL electronic data combination.

Not only can numerous user requirements in the market be met, but also the chaos caused by the overlapping of numeric marks is prevented.

The numeric character of the numeric mark is correspondingly paired with the URL electronic data stored in the URL electronic data device 90.

Figure 2A:
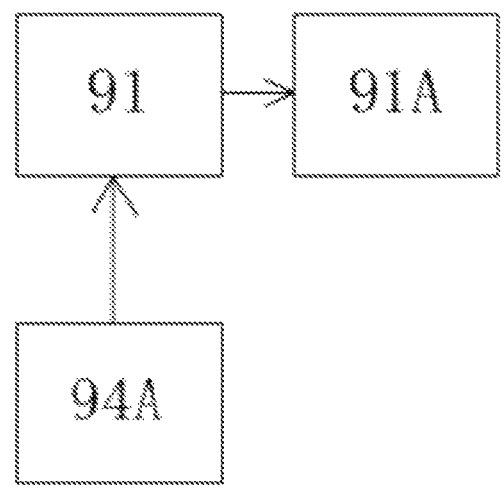
FIG. 2A is a schematic diagram 1 of a working principle of the URL electronic data device.

As shown in FIG. 2A, a design solution of the present embodiment is as follows: the raw URL electronic data combination of the built-in URL electronic data device 91 is a series of 0000+(0001~9999); the automatic trigger URL electronic data device 94A has the URL electronic data of "0001", activates the raw URL electronic data combination stored in the built-in URL electronic data device 91 of the communication terminal product and transforms the raw URL electronic data combination into another new set of URL electronic data combination; and the raw URL electronic data combination is transformed from the series of 0000+(0001~9999) into the series of 0001+(0001~9999).

Figure 2B:
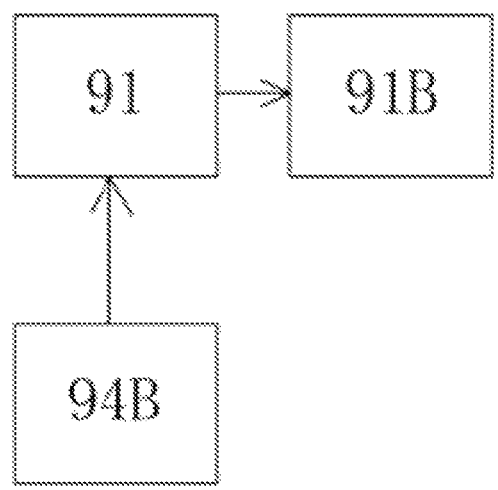
FIG. 2B is a schematic diagram 2 of a working principle of the URL electronic data device.

As shown in FIG. 2B, a design solution of the present embodiment is as follows: the raw URL electronic data combination of the built-in URL electronic data device 91 is a series of 0000+(0001~9999); the automatic trigger URL electronic data device 94B has the URL electronic data of "0033", activates the raw URL electronic data combination stored in the built-in URL electronic data device 91 of the communication terminal product and transforms the raw URL electronic data combination into another new set of URL electronic data combination; and the raw URL electronic data combination is transformed from the series of 0000+(0001~9999) into the series of 0033+(0001~9999).

Figure 3A:
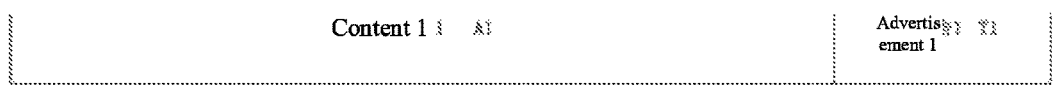
FIG. 3A is a schematic diagram 1 of a point to point principle of the technology of the present invention.

The automatic trigger URL electronic data device 94 continuously sends single URL electronic data in a set time, as shown in FIG. 3A.

Figure 3B:
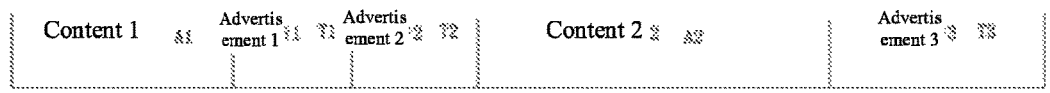
FIG. 3B is a schematic diagram 2 of a point to point principle of the technology of the present invention.

If necessary, the URL electronic data device can be set to continuously send a plurality of URL electronic data series in a set time, as shown in FIG. 3B.

The numeric mark corresponding to the sound playing is correspondingly paired with the URL electronic data combination stored in the URL electronic data device 90.

The electronic audio product is provided with a light source function system, and the URL electronic data sent by the automatic trigger URL electronic data device (94) is matched with a change in a light source function.

A user operates through a smart phone under the guidance of the change in the light source function of the electronic audio product, thereby achieving a point to point effect.

The electronic audio products include public broadcasting station and an audio player.

The automatic trigger URL electronic data device can be assembled with a set top box product of the audio player.

Sources linked to the URL electronic data are from various aspects, including memory, cloud storage, webpages based on login settings and the like, and the relevant technologies will not be explained in detail any more since they are extremely conventional and common in the market.

To improve the efficiency of a traditional product, there have been different technical solutions in the market, including the solution of two-dimensional barcode/quick response code patterns, the solution of NFC technology and the solution of RFID technology and the like. Relevant technical solutions and the application of the technology of the present invention are compared as follows.

To improve the transmission effect of the traditional media, there are different technical association solutions in the market, and one is the solution of two-dimensional barcode/quick response code patterns. However, the two-dimensional barcode/quick response code pattern technology cannot address the sound playing association with an audio information signal completely.

So far, however, there is no technical inspiration provided in the prior art in this field with respect to audio interaction implemented with associated data contained in the audio information signal.

Figure 4A:
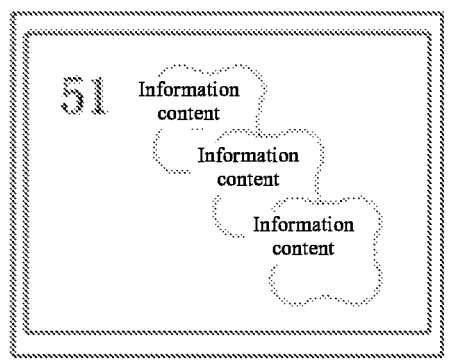
FIG. 4A is a schematic diagram 1 of an application of an electronic audio product employing the technology of the present invention.
Figure 4A:
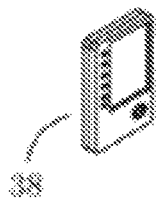

As shown in FIG. 4A, in this embodiment, after an electronic audio product employs the technology of the present invention, a corresponding numeric character 03 is entered into the communication terminal product 38 (a smart phone) according to an numeric mark (a guide) of the electronic audio product; and an operating system of the communication terminal product receives an instruction from the numeric mark, calls out URL electronic data paired with 03 and stored in the URL electronic data device 90, and sends a relevant request to a back-end server after processing the paired URL electronic data, the back-end server returns an electronic file associated with the URL electronic data of 03 according to the relevant request, and the electronic file is browsed through a display screen of the communication terminal product.

Figure 4B:
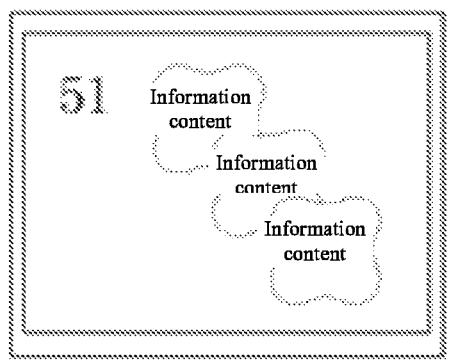
FIG. 4B is a schematic diagram 2 of an effect of the electronic audio product employing the technology of the present invention.
Figure 4B:
Figure 4B:
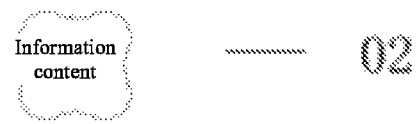
Figure 4B:

It is particularly emphasized that a user receives the URL electronic data from the electronic audio product supporting the PTP interactive interconnected system through the communication terminal product (a smart phone) as guided by a played audio content of the electronic audio product, as shown in FIG. 4B, to achieve the arbitrary point to point effect.

The technology of the present invention provides a technical solution having a category different from that of the solution of two-dimensional barcode/quick response code patterns, and thus has distinct effects as follows:

1. basically no limit from distance;
2. basically no impact from light conditions;
3. accuracy superior to that of the solution of two-dimensional barcode/quick response code patterns; and
4. fewer impacts to the aesthetic appearance of an advertising board due to substitution of the two-dimensional barcode/quick response code pattern with the numeric character.

With reference to the effects of the relevant embodiments above, the technology of the present invention is obviously superior in terms of operation, fabrication cost and transmission effect compared with relevant technical solutions and product solutions in the market, and the technology of the present invention will be further developed to affect all the links of a commercial chain and create a brand-new form of commercial mode and value chain.

Though the technology of the present invention is disclosed with the embodiments above, the scope of the technology of the present invention is not limited thereto, and all the components above may be substituted with other similar or equivalent elements known to those skilled in the art without departing from the conception of the technology of the present invention.

What is claimed is:

1. A PTP interactive interconnected system comprising a communication terminal product configured to support the PTP interactive interconnected system, a URL (Uniform Resource Locator) electronic data device, an electronic audio product and a numeric mark, wherein the PTP interactive interconnected system is configured to support connection of the electronic multimedia product to internet; wherein the communication terminal product is configured to support a remote communication function;
the communication terminal product is configured to support a short distance communication function; and
the URL electronic data device consists of a built-in URL electronic data device and a trigger URL electronic data device;
the URL electronic data device is configured to store an URL electronic data combination;
the electronic audio product is configured to support sound playing;
the communication terminal product is configured to support inputting of a numeric mark corresponding to the sound playing; and
an operating system of the communication terminal product is configured to receive an instruction from the numeric mark, call out paired URL electronic data stored in the URL electronic data device, and send a relevant request to a back-end server after processing the paired URL electronic data, and the back-end server is configured to return an electronic file associated with the URL electronic data according to the relevant request.

2. The PTP interactive interconnected system of claim 1, wherein the communication terminal product is configured to support the remote communication function and request a relevant telecommunication network to return an electronic file linked to the URL electronic data.

3. The PTP interactive interconnected system of claim 1, wherein the communication terminal product is configured to support WIFI (Wireless Fidelity) technology and request a connected WIFI device to return an electronic file associated with the URL electronic data.

4. The PTP interactive interconnected system of claim 1, wherein the communication terminal product is configured to support Bluetooth technology.

5. The PTP interactive interconnected system of claim 1, wherein the URL electronic data transmission device is configured to send the URL electronic data containing an identifier of the PTP interactive interconnected system by means of Bluetooth technology.

6. The PTP interactive interconnected system of claim 1, wherein the URL electronic data device consists of a built-in URL electronic data device and an automatic trigger URL electronic data device.

7. The PTP interactive interconnected system of claim 6, wherein the built-in URL electronic data device is equipped in the communication terminal product, and the built-in URL electronic data device is configured to store to a raw URL electronic data combination.

8. The PTP interactive interconnected system of claim 6, wherein the automatic trigger URL electronic data device is equipped in the electronic audio product, and is configured to send the URL electronic data based on a time condition set by the electronic audio product to activate the raw URL electronic data combination stored in the built-in URL electronic data device of the communication terminal product and transform the raw URL electronic data combination into another new set of URL electronic data combination.

9. The PTP interactive interconnected system of claim 1, wherein the automatic trigger URL electronic data device is configured to continuously send single URL electronic data in a set time.

10. The PTP interactive interconnected system of claim 1, wherein the numeric mark corresponding to the sound playing is correspondingly paired with the URL electronic data combination stored in the URL electronic data device.

11. The PTP interactive interconnected system of claim 1, wherein the electronic audio product is provided with a light source function system configured to automatically trigger the URL electronic data device to send the URL electronic data to correspond to a change in a light source function.

* * * * *